2,842,556
Patented July 8, 1958

2,842,556
PHTHALIDES

Donald D. Wheeler, and David C. Young, Midland, Mich., assignors to The Dow Chemical Company, Midland, Mich., a corporation of Delaware No Drawing. Application July 5, 1956
Serial No. 595,857

3 Claims. (Cl. 260—343.3)

This invention is concerned with phthalides having the formula

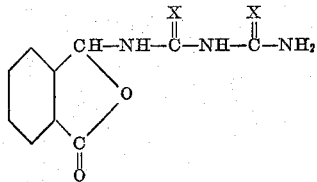

In this and succeeding formulae X represents oxygen or sulfur. The new compounds are light-colored solids somewhat soluble in organic solvents such as acetone and ethanol, and substantially insoluble in water. The compounds are useful insecticides. They also have antimicrobial properties and are adapted to be employed as toxic constituents in disinfectant preparations.

The above compounds may be prepared by causing phthalaldehydic acid to react with a biuret having the formula

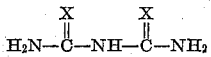

to produce the desired phthalide and water of reaction. The terms "phthalaldehydic acid" and "3-hydroxyphthalide" refer to a compound having the structure

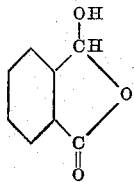

Phthalaldehydic acid is often represented in the literature as having the structure

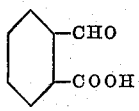

However, the acid employed in this invention and prepared as hereinafter described exists almost entirely in the 3-hydroxyphthalide ring structure, as indicated by a study of its infrared absorption spectrum. Infrared data also indicate the phthalide products to have the ring structure.

In the synthesis, good results are obtained when substantially equimolar proportions of each reactant are employed. The reaction takes place smoothly in the temperature range of from 20° to 150° C. The reaction is preferably carried out in the presence of a solvent as reaction medium. Suitable solvents include water, benzene and 2-butanone. Generally, the product precipitates in the reaction mixture and may be recovered by filtration. Alternatively, the solvent may be removed by vaporization and the product recovered as a residue.

In one method of carrying out the reaction, equimolar amounts of phthalaldehydic acid and the appropriate biuret are mixed with or dissolved in an organic solvent such as 2-butanone or benzene. The resulting mixture is heated under reflux for from 0.5 to 4 hours. Usually the phthalide product precipitates during the heating period. After completion of the heating, the mixture is cooled, and the product separated therefrom by filtration. If desired, the latter may be purified by washing or recrystallization.

In an alternative method of carrying out the reaction, phthalaldehydic acid is dissolved in a sufficient amount of warm water and mixed with an aqueous solution containing an equimolar amount of the appropriate biuret. A reaction takes place with the formation of the desired phthalide product which precipitates in the reaction mixture. The resulting mixture is warmed at 80°–90° C. for 10 to 90 minutes to complete the reaction. The mixture is then cooled and filtered to obtain the desired product. The product may be purified, if desired, as previously described.

The following examples illustrate the invention, but are not to be construed as limiting.

*Example 1.—3-(3-carbamoylureido)phthalide*

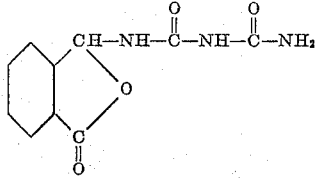

24.2 grams (0.2 mole) of biuret monohydrate, 60.0 grams (0.4 mole) of phthalaldehydic acid and 150 milliliters of water were mixed and heated on the steam bath for 3 hours. During the course of the heating a solid precipitated in the mixture. The mixture was then cooled in an ice bath to precipitate further product and then filtered to isolate a 3-(3-carbamoylureido)-phthalide product. The latter, after washing successively with water and alcohol and then drying, melted at 223–225° C. with decomposition.

*Example 2.—3-(3-thiocarbamoyl-2-thioureido)phthalide*

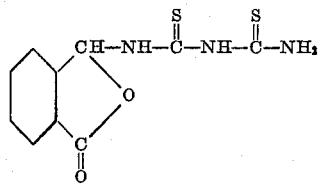

20.2 grams (0.15 mole) of dithiobiuret, 45.0 grams (0.30 mole) of phthalaldehydic acid and 200 milliliters of water were mixed and heated on the steam bath for 4 hours. During the course of the heating an amber colored oil slowly separated forming two layers. After completion of the heating, the aqueous layer was decanted from the mixture and cooled whereupon a solid precipitated. The latter was filtered from the mixture and dried to obtain a 3-(3-thiocarbamoyl-2-thioureido)-phthalide product melting at 109°–113° C.

The insecticidal properties of the phthalides may be illustrated by a representative operation wherein substantially complete mortality was observed when cockroaches (*Periplaneta americana*) were wetted with an aqueous composition containing 0.24 gram of 3-(3-thiocarbamoyl-2-thioureido)phthalide per 100 milliliters of dispersion.

The products are also useful in antimicrobial compositions. In a representative operation, solid nutrient agar media saturated with 3-(3-carbamoylureido)phthalide gave complete inhibition of growth when streaked with *Salmonella typhosa* and *Staphylococcus aureus* and incubated at 30° C. for 30 days.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene may be heated with an aqueous constant boiling hydrochloric acid and ferric chloride solution to obtain phthalaldehydic acid as more fully disclosed in U. S. Patent 2,748,162.

We claim:
1. A phthalide having the formula

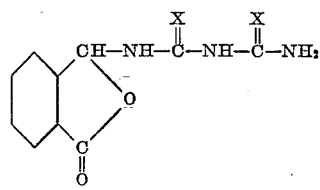

wherein each X represents the same member selected from the group consisting of oxygen and sulfur.
2. 3-(3-carbamoylureido)phthalide.
3. 3-(3-thiocarbamoyl-2-thioureido)phthalide.

No references cited.